United States Patent [19]

Youmans

[11] 4,042,260
[45] Aug. 16, 1977

[54] VEHICLE WHEEL SUSPENSION WITH ROLL FREEDOM

[75] Inventor: Donald W. Youmans, San Clara, Calif.

[73] Assignee: FMC Corporation, San Jose, Calif.

[21] Appl. No.: 683,133

[22] Filed: May 4, 1976

[51] Int. Cl.² .............................................. B60G 11/18
[52] U.S. Cl. ...................................... 280/721; 267/57; 180/71
[58] Field of Search .............. 280/721, 716, 717, 723, 280/726, 664, 700; 180/71, 73 TT; 267/57

[56] References Cited

U.S. PATENT DOCUMENTS 2,824,750  2/1958  De Lorean ..................... 280/721 X
2,942,871  6/1960  Krans ............................ 280/721 X Primary Examiner—Philip Goodman
Attorney, Agent, or Firm—R. S. Kelly; L. B. Guernsey; C. E. Tripp

[57] ABSTRACT

A torsion bar oriented longitudinally of a motor vehicle and along the center thereof is connected at its ends to the frame of the vehicle so as to permit the frame to rotate about the axis of the bar. A pair of control arms are each connected between the torsion bar and a corresponding one of the front wheels. The inner end of a first control arm is rigidly connected near one end of the torsion bar and the inner end of the second control arm is rigidly connected to the other end of the torsion bar so that the upward movement of the wheels relative to the frame of the vehicle applies opposite torsional loads to the ends of the torsion bar. The torsion bar and control arms provide support for the vehicle frame at the front end of the vehicle while allowing complete transverse roll freedom of that end of the vehicle. The front wheels are connected together by an axle which is flexibly connected to the outer ends of each of the control arms whereby the control arms are constrained to move together as one or the other of the front wheels encounters an obstacle.

9 Claims, 6 Drawing Figures

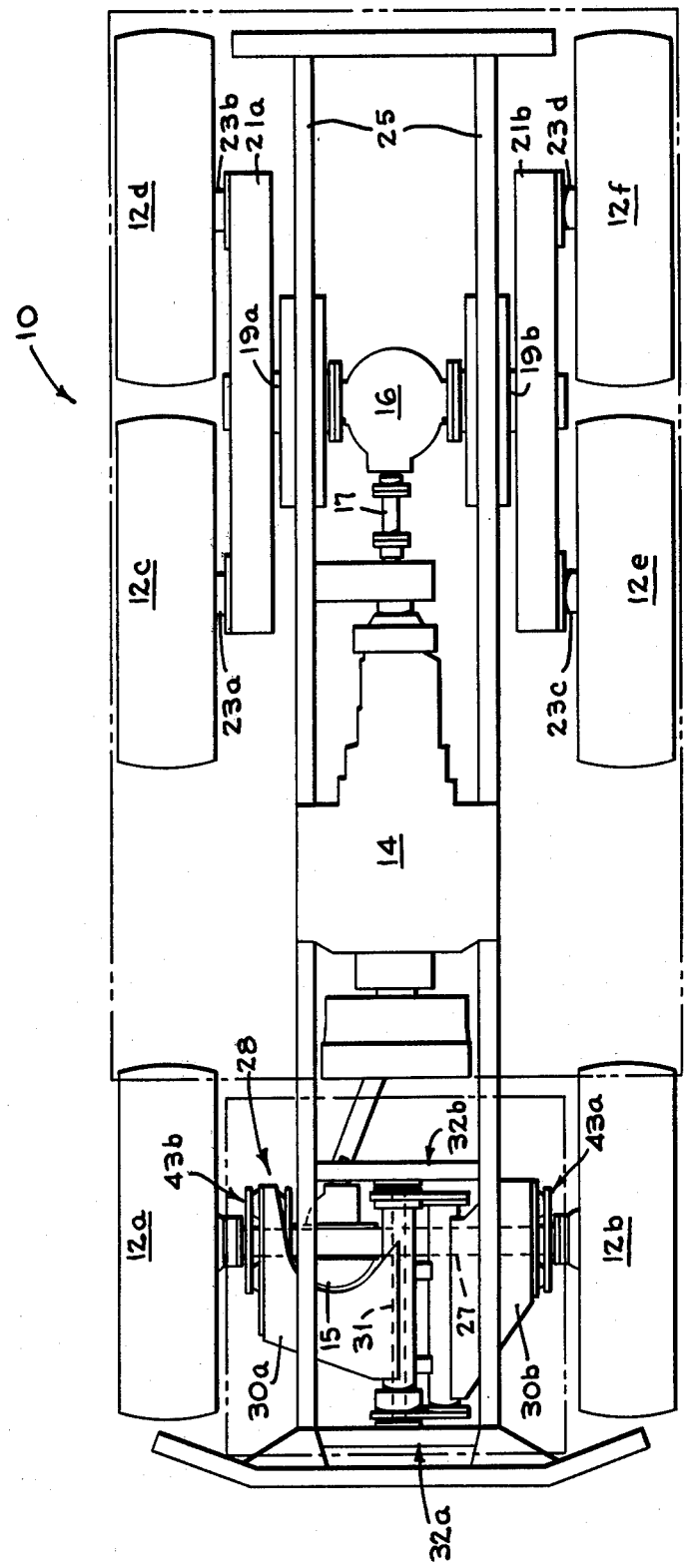
FIG_1

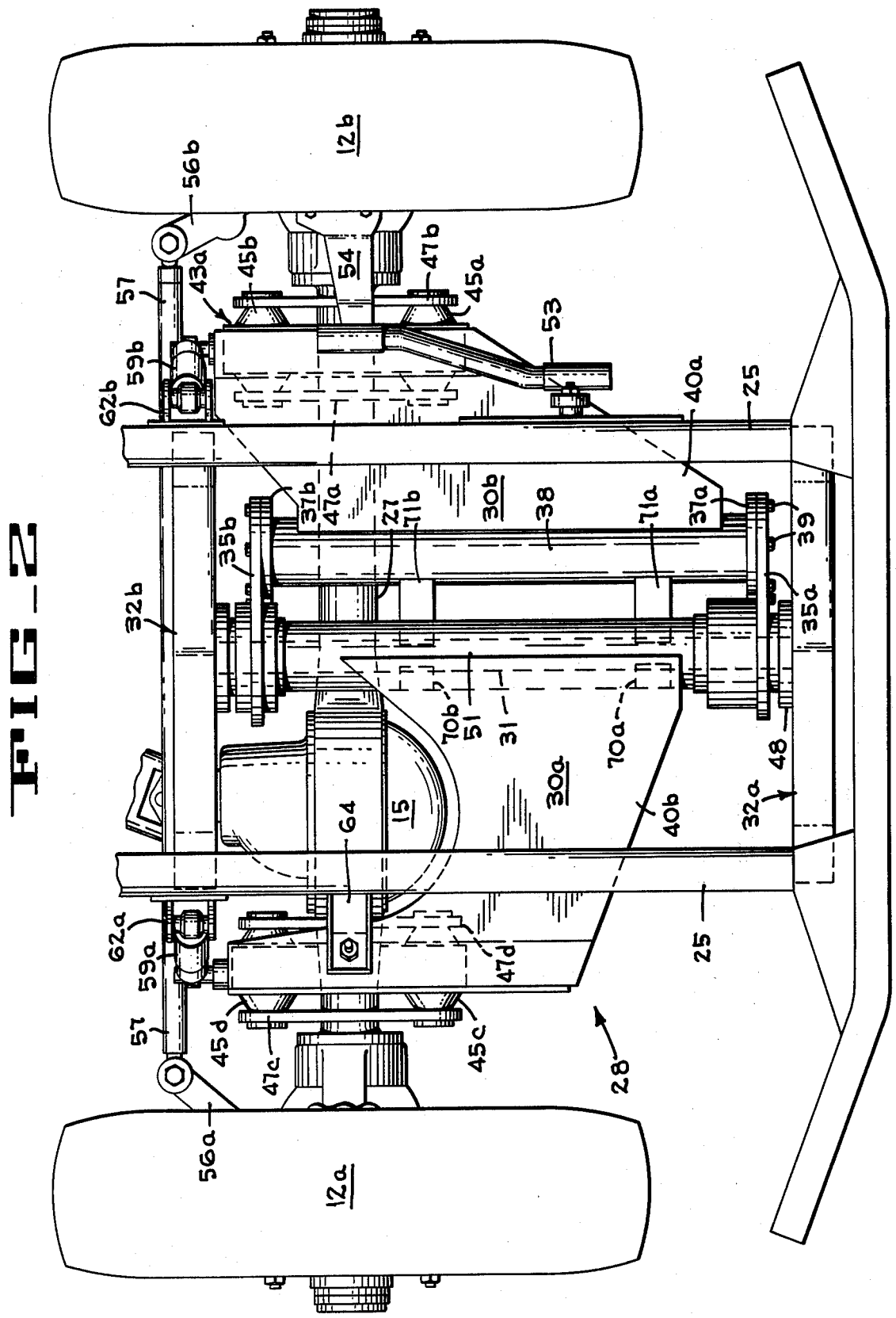

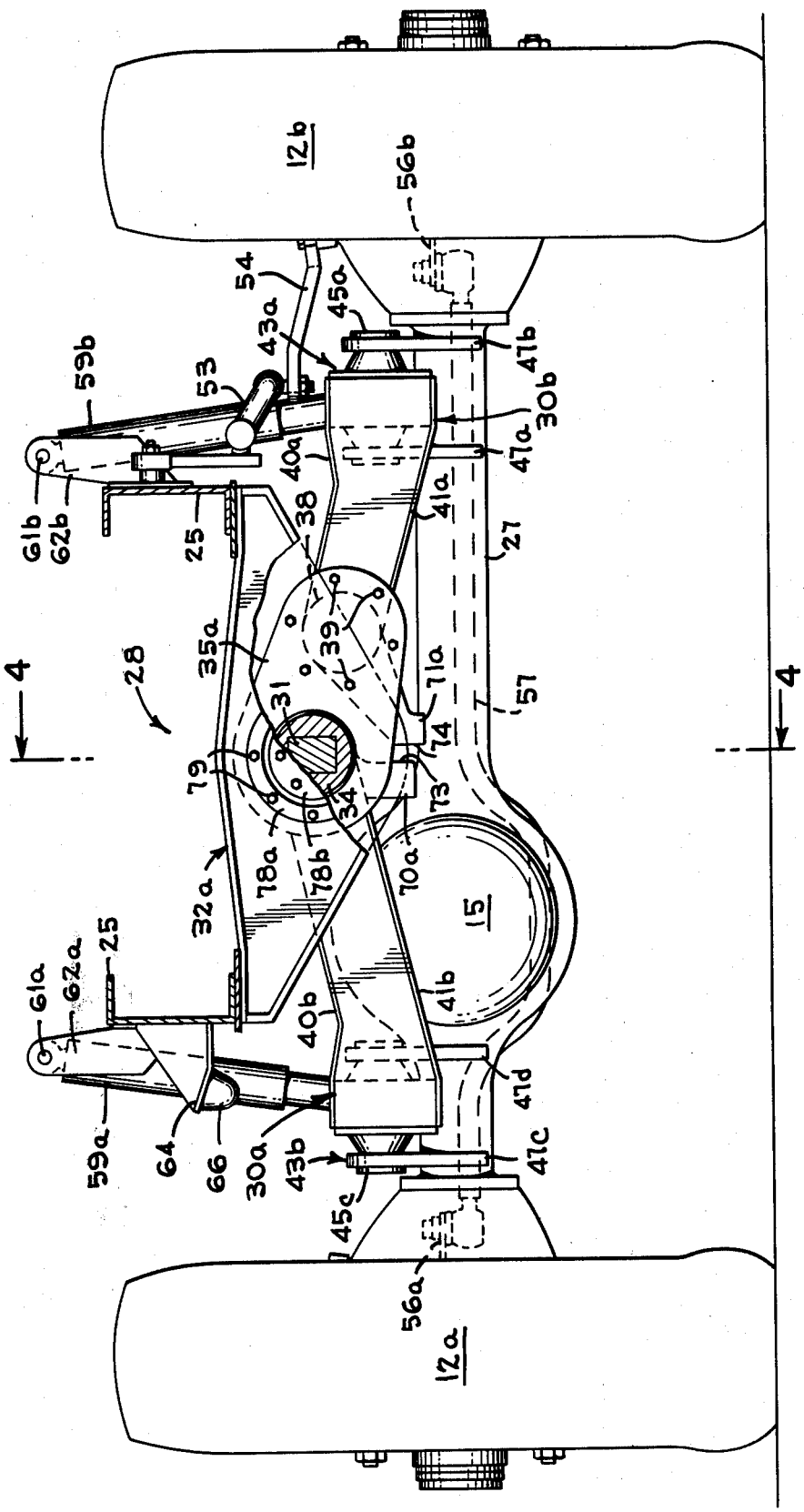

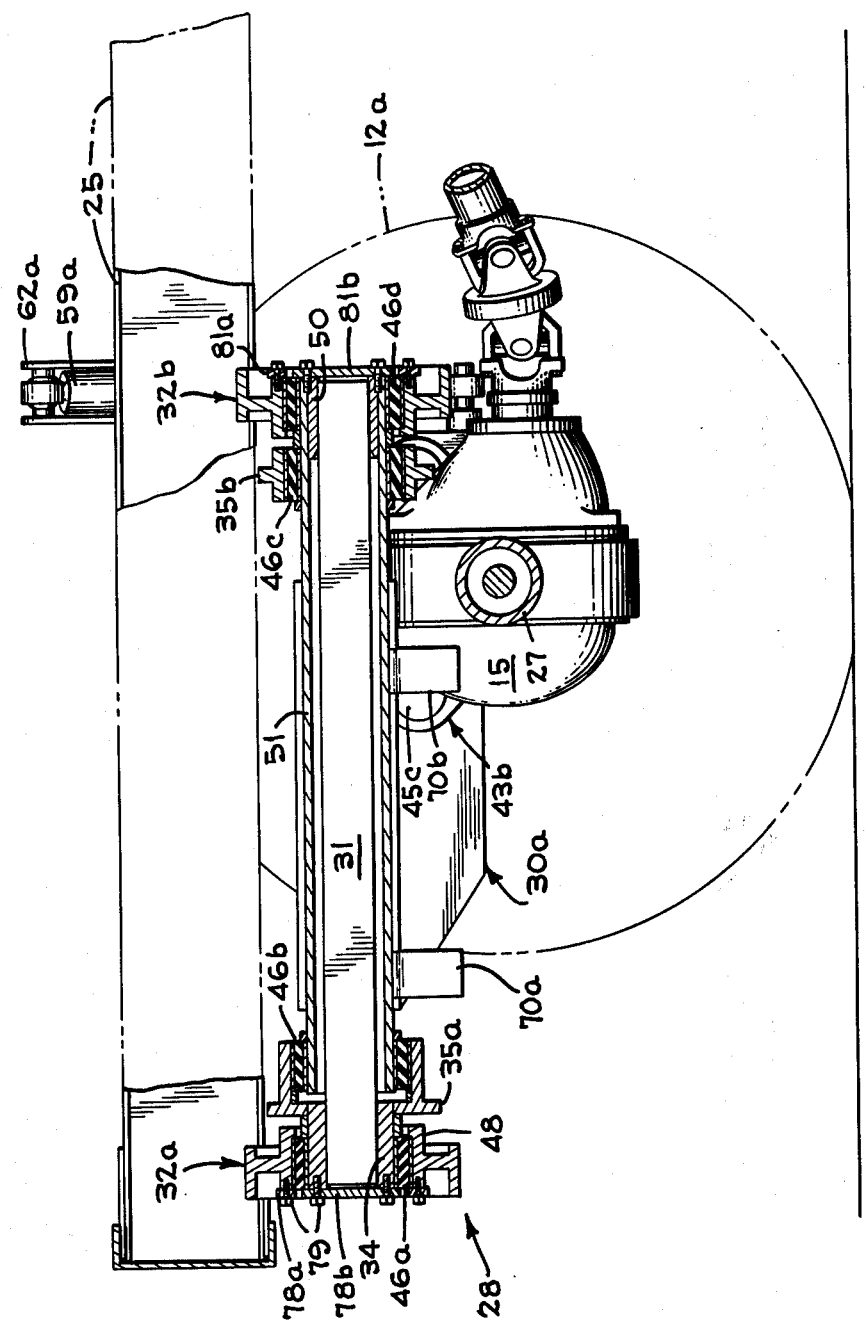
FIG_4

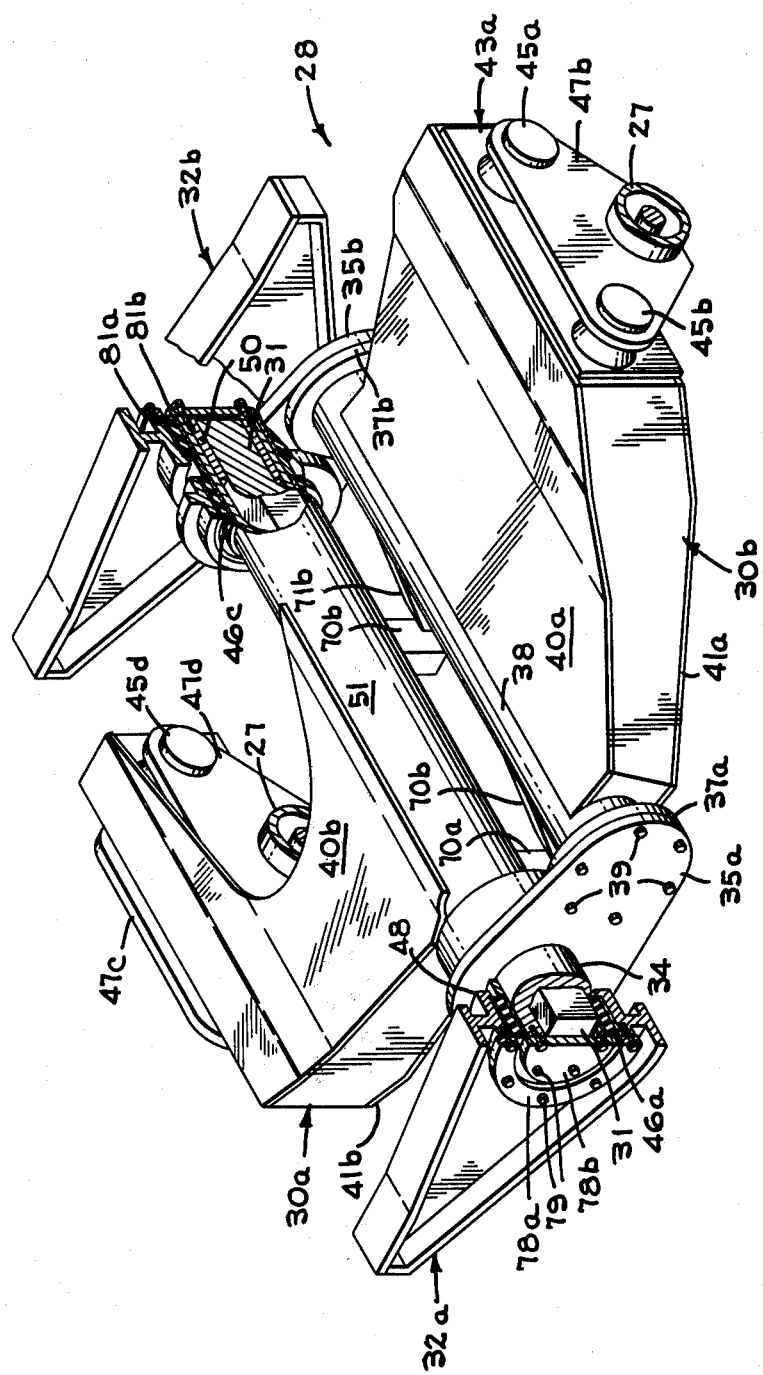
FIG_5

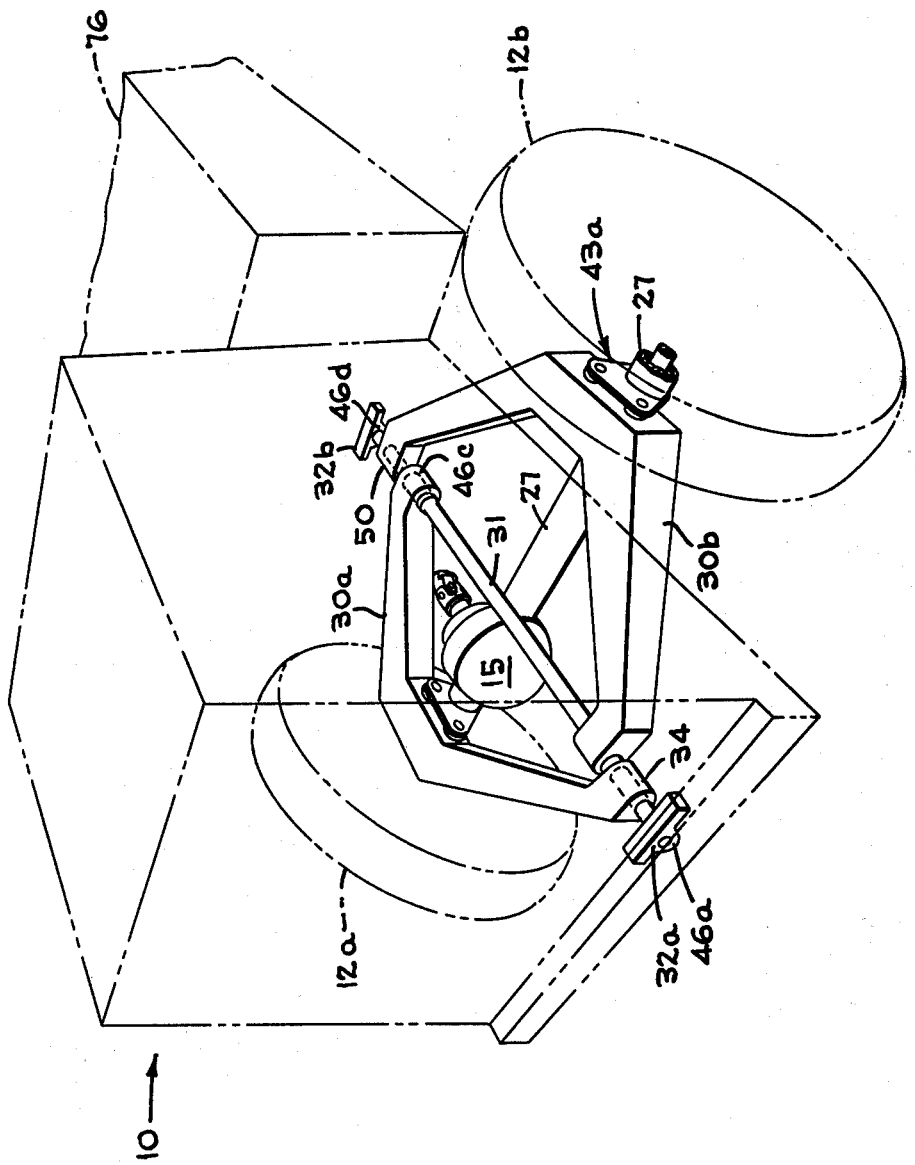
FIG_6

VEHICLE WHEEL SUSPENSION WITH ROLL FREEDOM

The Invention herein described was made in the course of or under a contract with the Department of the Army.

BACKGROUND OF THE INVENTION

1. Field of the Invention

The present invention pertains to a suspension system for use with a wheeled motor vehicle, and more particularly, it pertains to a suspension system which allows the suspended motor vehicle frame to roll transversely of the vehicle without twisting.

2. Description of the Prior Art

Prior art suspension systems for heavy duty motor vehicles generally include a rear suspension which is connected to the rear portion of the frame of the motor vehicle in at least two points along a transversely connected rear axle. The axle is usually connected to the frame or body of the vehicle by a spring suspension system of some type. A front axle can be similarly spring connected to the frame of the motor vehicle at two points which are spaced transversely across the width of the vehicle. The springs will accommodate vertical movement of the axles relative to the frame of the vehicle within predetermined limits as set by the spring structure. However, in uneven terrain the suspension system may move up and down relative to the frame of the vehicle to such an extent that the springs reach the limit of their travel thereby either causing the frame of the motor vehicle to bend or twist or causing one or more wheels to be lifted from the ground resulting in a loss of tractive effort. Even in travel over highways and streets wherein oppositely inclined surfaces are encountered the front wheels and suspension system may cause the front end of the frame to roll in one direction while the rear wheels and rear suspension system cause the rear end of the frame to roll in the opposite direction to twist the frame. This twisting of the frame of the motor vehicle can easily cause cracking or other permanent damage to the frame so that it may eventually fail. There have been many attempts to correct this problem, one of such attempts concerning the use of frames which are heavy enough so that they will not twist and distort. However, these heavy rigid frames will typically cause one or more of the wheels to be lifted off the ground while the vehicle is traveling over uneven terrain. Lifting of a wheel off of the ground causes the vehicle to lose traction and may have a significant adverse effect in both the maneuvering and propelling of the vehicle.

SUMMARY OF THE INVENTION

With the suspension system of the present invention a torsion bar is rotatably mounted to the frame of a motor vehicle with the bar extending along the length of the vehicle at one end thereof and along the centerline thereof. A pair of control arms are each rigidly connected between the torsion bar and a corresponding one of a pair of laterally spaced wheels of the motor vehicle so as to apply oppositely directed torsional forces to the torsion bar. This suspension system, when applied to the front wheels of the motor vehicle, allows the front end of the vehicle to roll in the same direction as the rear end of the vehicle regardless of the relative transverse orientation of the front wheels so that the frame of the vehicle does not twist or distort.

BRIEF DESCRIPTION OF THE DRAWINGS

FIG. 1 is a diagrammatic plan view of a motor vehicle using the suspension system of the present invention.

FIG. 2 is an enlarged plan view of a portion of the vehicle shown in FIG. 1 particularly illustrating the details of the suspension system as used in the front end of the vehicle.

FIG. 3 is a front elevation of the suspension system shown in FIG. 2 with a portion thereof being cut away for the purposes of illustration.

FIG. 4 is a section generally taken on line 4—4 of FIG. 3.

FIG. 5 is an isometric detail view of the suspension system of the present invention with portions thereof being cut away and shown in section.

FIG. 6 is a diagrammatic perspective view of a simplified suspension system which utilizes the general concepts and principles of the present invention.

DESCRIPTION OF THE PREFERRED EMBODIMENT

Referring now more particularly to the drawings, FIG. 1 discloses a motor vehicle 10 having a plurality of support wheels 12a–12f all powered by a power plant 14 located near the central portion of the vehicle. Power is coupled from the power plant to a differential 16 by a drive shaft 17 to power the rear wheels. Power is coupled from the differential to each of the rear wheels 12c–12f by a pair of short laterally extending axles 19a and 19b, gear units located in a pair of walking beams 21a and 21b, and a plurality of outer drive axles 23a–23d which drive the wheels in tandem pairs at each side of the vehicle. The rear wheels are thus connected to main frame members 25 of the vehicle by conventional walking beam suspension members 21a and 21b, such as used in the Hendrickson tandem-truck suspension system that is commonly used in heavier motor vehicles. The front wheels 12a, 12b are driven through differential 15 and transversely extending axle 27.

The front wheels 12a and 12b may be steered by the usual steering wheel, tie rod 57 and steering arms 56a, 56b (FIG. 2), the latter being connected directly to the wheels. The front wheels are rotatably mounted on the outer ends of the front axle 27 which is connected by a front suspension 28 to the frame 25 of the vehicle, such suspension comprising the subject matter of the present invention. The front suspension includes a pair of control arms 30a and 30b which are connected to the axle and to opposite sides of a torsion bar 31. Each end of the torsion bar 31 is rotatably connected to a corresponding one of a pair of pivot mounts 32a and 32b which, in turn, are rigidly connected to the main frame members 25 of the motor vehicle. Thus, the frame at the front end of the motor vehicle is suspended at two longitudinally spaced points along a single centrally located axis by connection to the pivot mounts 32a and 32b so that the front end of the vehicle frame is free to roll about the axis of the pivot mounts and follow the rear of the vehicle frame which will roll in a direction that is determined by the terrain and by the rear suspenion system.

Details of the front suspension 28 are shown in FIGS. 2–5. The front end of the torsion bar 31 is splined to a socket 34, as shown in FIG. 4, with the socket being connected to one end of a connecter arm 35a. The other end of connector arm 35a is bolted (FIG. 5) to a flange 37a at the front end of a tube 38 (FIG. 2) by a plurality of bolts 39, and the tube 38 extends parallel to the torsion bar and is connected to a top plate 40a and a bottom plate 41a of the control arm 30b, as best seen in FIGS. 3 and 5. A flexible suspension unit 43a is connected to the outer end of the top and bottom plates 40a, 41a and includes a pair of flexible rubber mounts 45a and 45b which are connected to a pair of spaced support plates 47a and 47b. The support plates mount the housing of axle 27, and the flexible rubber mounts allow the control arm 30b to move and twist relative to the support plates 47a and 47b and the axle 27. The support plates 47a and 47b are welded directly to the housing for axle 27. A flange 37b, at the rear end of the tube 38, is connected to one end of a connecter arm 35b as seen in FIGS. 2 and 5. The projective end of the arm 35b is rotatably connected to the rear end of a tube 51 by a flexible rubber annulus 46c mounted between the tube and the arm 35b (FIGS. 4 and 5) and which is fixed to both but which allow relative rotational movement of the arm 35b about the tube 51. The tube 51 extends about and is coextensive with the torsion bar 31. Thus, the front end of control arm 30b is rigidly fastened to the front end of the torsion bar 31 while the rear end of the control arm 30b may rotate about the torsion bar. The socket 34 is connected to the front pivot mount 32a through a flexible rubber annulus 46a mounted between the socket 34 and a cylindrical housing 48 of the pivot mount so that the socket may rotate in the housing 48 of the pivot mount. A pair of plates 78a and 78b (FIG. 5) cover the front end of the torsion bar 31 and the aforedescribed joints to keep out dirt. These plates are held in place by a plurality of bolts 79 (FIG. 5). A pair of plates 81a and 81b cover the rear end of the torsion bar in a similar manner.

The rear end of the torsion bar 31 is splined to a socked 50 which is affixed to the tube 51 (FIG. 4) so that the tube 51 and the rear end of the torsion bar rotate together. The front end of the tube 51 is connected to a flexible rubber annulus 46b mounted between the tube and the arm 35a. The control arm 30a will be seen to comprise a top plate 40b and a bottom plate 41b which are rigidly connected to the tube 51 as shown in FIG. 5. Thus, the rear end of control arm 30a is rigidly fastened to the rear end of the torsion bar 31 while the front end of the control arm 30a may rotate about the axis of the torsion bar. A flexible suspension unit 43b is connected to the outer end of the top and bottom plates 40b and 41b, such suspension unit being similar to the unit 43a and including a pair of flexible rubber mounts 45c and 45d which dependingly support a pair of support plates 47c and 47d which are welded to the axle housing 27 and allow the control arm 30a to have limited flexible movement relative to the axle housing.

A plurality of projecting stop arms 70a, 70b, 71a and 71b (FIGS. 2 and 3) are mounted to the tubes 38 and 51 and serve to limit the opposed rotational movement of the control arms 30a and 30b in the downward direction. For example, when the control arm 30a rotates counterclockwise as seen in FIG. 3 and the control arm 30b rotates in the clockwise direction, the face 73 of the stop arm 70a will contact the face 74 of the stop arm 71a to prevent any further rotation of the control arms and to prevent the load from being transmitted through the flexible suspension units 43a and 43b.

Steering of the motor vehicle is provided by a drag link assembly 53 and a knuckle arm 54 (FIG. 2) with the drag link assembly being connected to a conventional steering gear and steering wheel (not shown) to provide steering of the left front wheel 12b. The left front wheel is connected by a pair of steering arms 56a and 56b and a tie rod 57 to the right front wheel 12a to provide steering of the right front wheel of the motor vehicle. A pair of shock absorbers 59a and 59b (FIG. 3) are connected between the frame 25 and the upper face of a corresponding one of the control arms 30a and 30b. The upper end of each of the shock absorbers is connected to an ear 62a, 62b of the frame 25 by bolts 61a, 61b, respectively, while the lower end of each of the shock absorbers is connected to the corresponding control arm. A bumper plate 64 (FIG. 3) connected to the frame 25 carries a depending cone of elastic material 66 which makes contact with the upper plate 40b of the control arm 30a to limit the upward travel of the control arm relative to the frame of the motor vehicle.

A simplified diagrammatic illustration of the subject invention is presented in FIG. 6. Each of the parts of the suspension of the simplified drawing has been labeled with the same legend number as the corresponding part in the preferred embodiment of FIGS. 1-5. A portion of the control arms has been removed to show other details of the suspension. The details of the mounting of the control arms to the torsion bar has been simplified to illustrate the principle of operation of the suspension.

The right control arm 30a is splined to the front end of the torsion bar 31 at the point 34 but is free to rotate about the torsion bar near the rear end of the bar at the joint 46c. The left control arm 30b is splined to the torsion bar 31 at the point 50 at the rear end of the bar but is free to rotate about the front end of the torsion bar at a joint 46b. The torsion bar is mounted for relative rotational movement to the front pivot mount 32a at the joint 46a and is similarly mounted to the rear pivot mount 32b at the joint 46d. The front pivot mount 32a and the rear pivot mount 32b are each connected to the frame of a motor vehicle 10 shown in phantom lines.

When the vehicle is on a level road and under a normal load, the axle 27 will be positioned a distance below the torsion bar 31 as shown in FIG. 6. The torsion bar is under stress due to the weight being supported by each of the control arms 30a and 30b with the right control arm 30a causing the torsion bar at the front of the vehicle to rotate into a slight clockwise position as viewed from the front of the vehicle. On the other hand, the weight which is supported by the left control arm 30b causes the rear end of the torsion bar to rotate into a slightly counterclockwise position as viewed from the front of the vehicle. Thus, the torsion bar is under opposed torsional stresses due to the weight of the vehicle and its load.

When a raised section of the road is encountered by the left wheel 12b the left control arm 30b is raised above the position shown in FIG. 6. The right control arm 30a will also be raised, but by a lesser amount than the left control arm 30b. The upward movement of the left control arm distorts the torsion bar to a greater degree by rotating the rear end of the torsion bar in a counterclockwise direction as viewed from the front of the vehicle. The slight lifting of the right control arm causes the front end of the torsion bar to rotate slightly clockwise with the ends of the torsion bar rotating at the pivot mounts 32a and 32b. The shock of the left wheel encountering a raised section of the road is thus absorbed by the torsion bar. The front of the vehicle rotates about the axis of the torsion bar, and its position will be determined by the position of the rear suspension so that it can remain relatively level. It can be seen that stress on the frame of the vehicle is much less than in prior art vehicles where axles are connected to the frame by heavy duty springs at each end of the vehicle and can thereby impose twisting forces.

The front end of the vehicle 10 is free to roll to follow any roll of the rear portion of the vehicle which may be caused by the rear wheels of the vehicle encountering holes or bumps in the road. For example, when the rear portion 76 of the vehicle of FIG. 6 rolls with a clockwise motion (as seen from the front of the vehicle), the front end of the vehicle is free to roll clockwise about joints 46a and 46d. This prevents undue stress on the frame and body of the vehicle.

It will be seen that the suspension of the present invention is basically provided by the longitudinally extending torsion bar and the laterally extending control arms to provide roll freedom for the front end of the motor vehicle. This suspension may also by used to support the central or rear portions of vehicles if desired.

Although the best mode contemplated for carrying out the present invention has been herein shown and described, it will be apparent that modification and variation may be made without departing from what is regarded to be the subject matter of the invention.

What is claimed is:

1. A suspension system for use with a motor vehicle having a frame and a plurality of supporting wheels, said suspension system comprising:
    a torsion bar extending longitudinally of said vehicle at one end thereof and generally along the centerline thereof;
    a pair of control arms with each arm extending transversely of said vehicle from one side of said torsion bar;
    means for rigidly connecting the inner end of one of said control arms to one end of said torsion bar;
    means for rigidly connecting the inner end of the other of said control arms to the other end of said torsion bar;
    mounting means for connecting said torsion bar to said frame of said vehicle so that said frame may rotate about the axis of said bar; and
    means for rotationally mounting a corresponding one of a pair of said wheels to the outer end of each of said control arms.

2. A suspension system as defined in claim 1 wherein said means for rotationally mounting said wheels includes an axle, means for connecting said axle to each of said control arms, and means for rotationally mounting each of said wheels to a corresponding end of said axle.

3. A suspension system as defined in claim 2 wherein said means for connecting said axle to said control arms includes flexible connecting means.

4. A suspension system as defined in claim 1 wherein said mounting means for connecting said torsion bar to the frame comprises an annular rubber member tightly secured to both said frame and said torsion bar and adapted to twist in torsion during relative rotational movement between the frame and torsion bar.

5. A suspension system as defined in claim 1 wherein the inner end of each control arm comprises a pair of spaced connecter arms, one of said connecter arms being rigidly attached to one end of said torsion bar and the other of said connecter arms being rotatably attached to the other end of said torsion bar.

6. A suspension system as defined in claim 5 wherein said means for rotationally mounting said wheels includes an axle, means for mounting said axle to the outer end of each of said control arms, and means for rotationally mounting a wheel on each of said axle.

7. A suspension system as defined in claim 6 including flexible connecting means for securing said axle to each of said control arms.

8. An axle suspension system for use with a motor vehicle having a frame and a plurality of wheels, said suspension system comprising:
    a torsion bar;
    flexible mounting means for connecting said torsion bar to said frame of said vehicle at one end thereof with said bar extending longitudinally of said vehicle to permit limited pivotal movement of said frame about the axis of said torsion bar;
    a pair of control arms, each arm extending laterally outwardly from a corresponding side of said torsion bar;
    means for rigidly connecting one side of one of said control arms to a first end of said torsion bar;
    a first flexible mounting joint for connecting the other side of said one control arm to a second end of said torsion bar for limited rotational movement of said one control arm about said second end of said torsion bar;
    means for rigidly connecting one side of the other of said control arms to second end of said torsion bar;
    a second flexible mounting joint for connecting the other side of said other control arm to said first end of said torsion bar for limited rotational movement of said other control arm about said first end of said torsion bar;
    a supporting axle for mounting a pair of wheels; and
    means for connecting said axle to each of said control arms.

9. An axle suspension system as defined in claim 8 wherein said means for connecting said axle to each of said control arms comprises a flexible connection.

* * * * *